US012151957B2

(12) United States Patent
Yang et al.

(10) Patent No.: US 12,151,957 B2
(45) Date of Patent: Nov. 26, 2024

(54) SYSTEM AND METHOD FOR ELECTROCHEMICAL OXIDATION MITIGATION OF HARMFUL ALGAL BLOOM AND CYANOTOXINS

(71) Applicants: Yang Yang, Potsdam, NY (US); Stefan Grimberg, Potsdam, NY (US); ShaSha Yang, Potsdam, NY (US); Luz Estefany Quispe Cardenas, Potsdam, NY (US)

(72) Inventors: Yang Yang, Potsdam, NY (US); Stefan Grimberg, Potsdam, NY (US); ShaSha Yang, Potsdam, NY (US); Luz Estefany Quispe Cardenas, Potsdam, NY (US)

(73) Assignee: CLARKSON UNIVERSITY, Potsdam, NY (US)

(*) Notice: Subject to any disclaimer, the term of this patent is extended or adjusted under 35 U.S.C. 154(b) by 604 days.

(21) Appl. No.: 17/164,347

(22) Filed: Feb. 1, 2021

(65) Prior Publication Data
US 2021/0238065 A1 Aug. 5, 2021

Related U.S. Application Data

(60) Provisional application No. 62/968,118, filed on Jan. 30, 2020, provisional application No. 63/109,285, filed on Nov. 3, 2020.

(51) Int. Cl.
*C02F 1/46* (2023.01)
*C02F 1/461* (2023.01)
(Continued)

(52) U.S. Cl.
CPC .......... *C02F 1/463* (2013.01); *C02F 1/46109* (2013.01); *C02F 1/4672* (2013.01);
(Continued)

(58) Field of Classification Search
CPC ...... C02F 1/46; C02F 1/32; C02F 1/72; C02F 1/42; C02F 1/36
See application file for complete search history.

(56) References Cited

U.S. PATENT DOCUMENTS

| 2013/0134080 A1* | 5/2013 | Shiue | C02F 1/463 210/192 |
| 2016/0362314 A1* | 12/2016 | Musson | C25B 11/02 |

FOREIGN PATENT DOCUMENTS

| CN | 105540729 A | * | 5/2016 | ............... C02F 1/30 |
| JP | 2011198606 A | * | 10/2011 | |

OTHER PUBLICATIONS

CN-105540729-A-translation (Year: 2016).*
JP-2011198606-A-Translation (Year: 2011).*

* cited by examiner

*Primary Examiner* — Walter D. Griffin
*Assistant Examiner* — Cameron J Allen
(74) *Attorney, Agent, or Firm* — BOND, SCHOENECK & KING, PLLC; David L. Nocilly

(57) ABSTRACT

Provided is a system and method using an electrochemical reactor and electrode materials that can effectively treat harmful algae contaminated water supply, such as lake water or seawater. The reactor features the compact design, easy transportation, scalable treatment capacity, and high efficiency for algae inactivation and the degradation of microcystin. The equipment can be installed on boats and docks to directly treat the lake water. It can be driven by electricity provided by grid power, generator, or solar panels, and requires no chemical input.

8 Claims, 9 Drawing Sheets

(51) Int. Cl.
  *C02F 1/463* (2023.01)
  *C02F 1/467* (2023.01)
(52) U.S. Cl.
  CPC ............... *C02F 2001/46142* (2013.01); *C02F 2303/20* (2013.01); *C02F 2305/023* (2013.01)

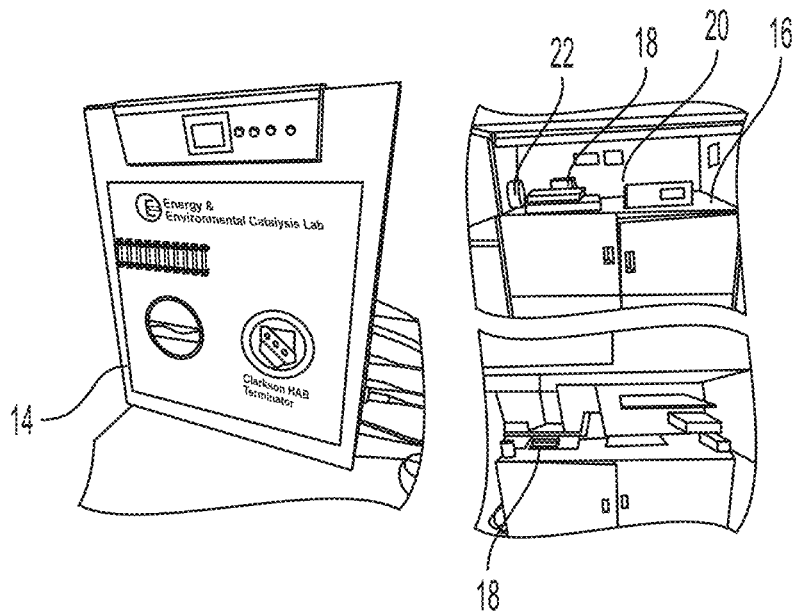
FIG. 2A    FIG. 2B
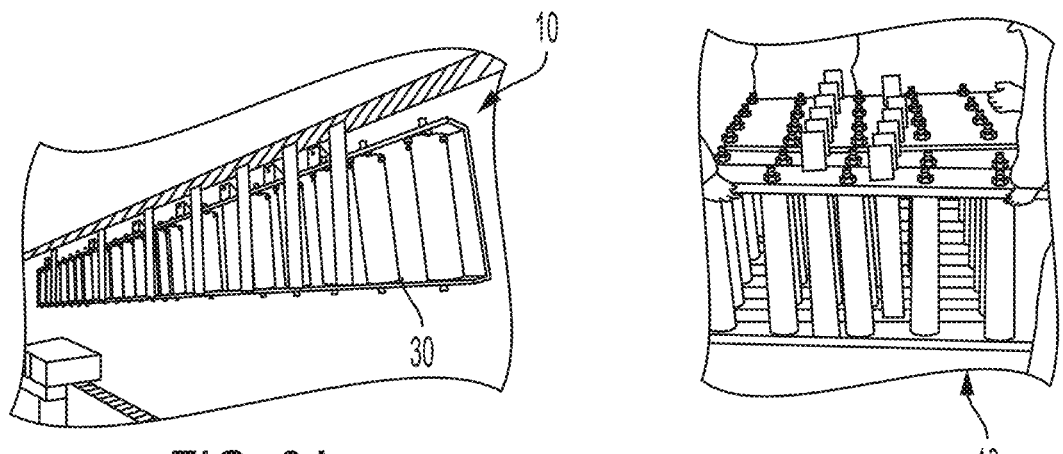
FIG. 3A
FIG. 3B
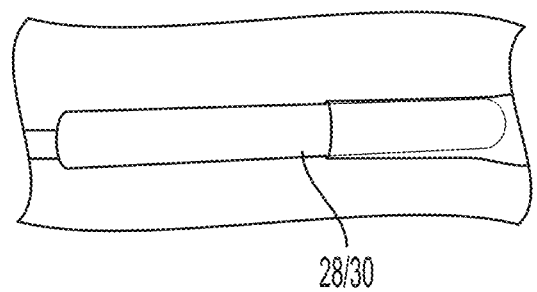
FIG. 3C

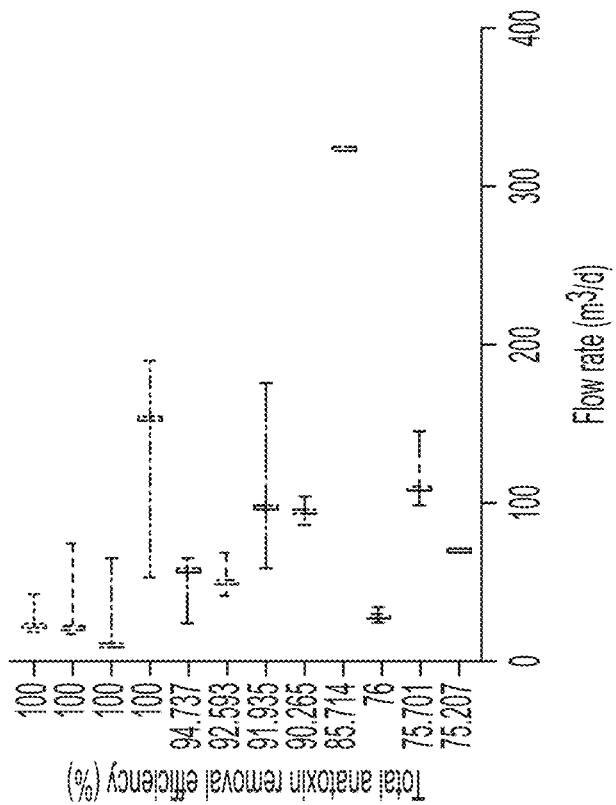
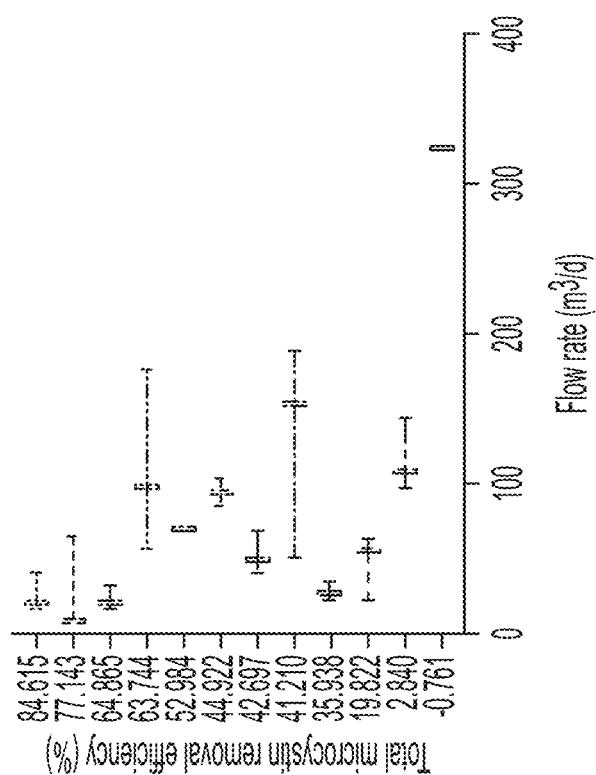
FIG. 16A
FIG. 16B

SYSTEM AND METHOD FOR ELECTROCHEMICAL OXIDATION MITIGATION OF HARMFUL ALGAL BLOOM AND CYANOTOXINS

CROSS-REFERENCE TO RELATED APPLICATION

This application claims priority to U.S. Provisional Patent Application Ser. No. 62/968,118, filed Jan. 30, 2020, and U.S. Provisional Patent Application Ser. No. 63/109,285, filed Nov. 3, 2020, the entire disclosure of each which is incorporated herein by reference.

FIELD OF THE INVENTION

The present disclosure is directed generally to electrochemical oxidation mitigation of harmful algal bloom and cyanotoxins.

BACKGROUND

Mitigating algae blooms and cyanotoxins from water supplies, such as lakes, is necessary for ensuring a safe and adequate water supply. Certain mitigation techniques involve physical systems such as ultrasonic, cavitation, irradiation and aeration, all of which involve expensive capital intense investments while also limiting the mobility and placement of the system. Chemical remediation techniques are effective but require input of chemicals into the system again, raising the cost and limiting the space in which such systems can be deployed.

Accordingly, there is a need in the art for a mitigation technology that reduces the cost of operation while also providing flexibility in the manner in which it can be deployed such that deployment can be done in the most effective place and and time.

SUMMARY

The present disclosure is directed to system and methods for removing harmful algae and destructing microcystins in water supplies.

According to an aspect is a reactor combining electrocoagulation (ECO) and electro-ozonation (EOZ) to remove harmful algae and destruct microcystins in a water supply, comprising a tank having a floor, sidewalls upstanding therefrom and having an upper edge, the walls and sidewalls collectively defining an open volume, an inlet port positioned adjacent the floor and an overflow weir defined by the upper edge of the sidewalls; an ECO electrode array comprising ozone producing anodes coupled to iron cathodes, and an EOZ electrode array comprising iron plates as both the anodes and cathodes, wherein the ECO and EOZ electrode arrays are each at least partially positioned within the open volume; a DC power source to drive the ECO and EOZ electrode arrays; a pump to pump the water supply into the tank's open volume through the inlet port, whereby the ECO electrode array releases Fe2+, which is transformed to flocs composed of Fe(OH)2 and Fe(OH)3 to capture algae cells, the flocs being brought to the surface by gas bubbles evolved from the electrolysis reactions and separated from water, and the EOZ electrode array producing oxidants which decompose microcystins.

According to an embodiment, the oxidants include ozone (O3), chlorine (HOCl/OCl—), and hydroxyl radical (·OH).

According to an aspect, a method for producing an EOZ electrode anode, comprising coating titanium mesh with organic solutions which contain tin (II)-organic complexes and other metal-organic complexes; calcinating the coated titanium mesh at 500-600° C. to convert metal-organic complexes to metal oxides; and repeating step 1 and 2 are repeated several times until the desired catalyst loadings are reached.

According to an embodiment, wherein the coating step is done by one of dip-coating or brush coating.

According to an aspect, a method for producing an electrode comprising a porous anode provided for electrochemical oxidation mitigation of harmful algal bloom and cyanotoxins, and comprising coating the electrode with electrocatalysts comprising Ti4O7, antimony-doped tin oxide (ATO), nickel-doped Sb—SnO2 (NATO), and fluorine-, nickel-codoped Sb—SnO2 (F-NATO).

According to an embodiment, the Ti4O7 particles are prepared by reducing TiO2 at 800-1000° C. in pure H2 atmosphere for 6-12 h.

According to an embodiment, the ATO, NATO, and F-NATO electrocatalysts are prepared by thermal oxidation of the corresponding organic precursors coated on the Ti metal substrates to mixed metal oxides at 500-600° C. in air.

According to an embodiment, preparing the ATO organic precursor comprises prepare citric acid sol-gel; adding citric acid (12.6 g) to 16 mL ethylene glycol at 90° C., stir till dissolved. preparing the ATO precursor; adding SnCl2 (3.4 g) and SbCl3 (0.5 g) to the citric acid sol-gel at 90° C., stirring until dissolved; adjusting the amount of chemicals and volume of sol-gel can be adjusted proportionally, wherein the Sb/Sn elementary molar ratio can range from 0.1 to 0.5.

According to an aspect, an electrode array, comprises a plurality of segments each of which comprises at least one anode each of which comprises a titanium metal filter and a surface coating of electrocatalysts; at least one perforated stainless-steel cathode, wherein each anode is positioned within a corresponding cathode; wherein each segment is hingedly connected to an adjacent segment, whereby the plurality of segments can be folded upon one another.

According to an embodiment, the average pore size of each titanium metal filter is 50 mm.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIGS. 2(a) and 2(b) are (a) front view of the control box, and (b) detailed components of power supply chamber, touch screen, pump chamber, and storage chamber, in accordance with an embodiment.

FIGS. 3(a), 3(b) and 3(c) are pictures of (a) electrode array, (b) folded electrode array, and (c) a filter anode, in accordance with an embodiment.

FIGS. 16(a) and (b) are graphs showing the Removal of (a) microcystin and (b) anatoxin after EOF treatment at various flow rates, in accordance with an embodiment.

DETAILED DESCRIPTION OF EMBODIMENTS

The present disclosure describes in one aspect an electrochemical reactor and electrode materials that can effectively treat harmful algae contaminated water supply, such as lake water, at a treatment capacity of 500 m3/day.

Figure 1:
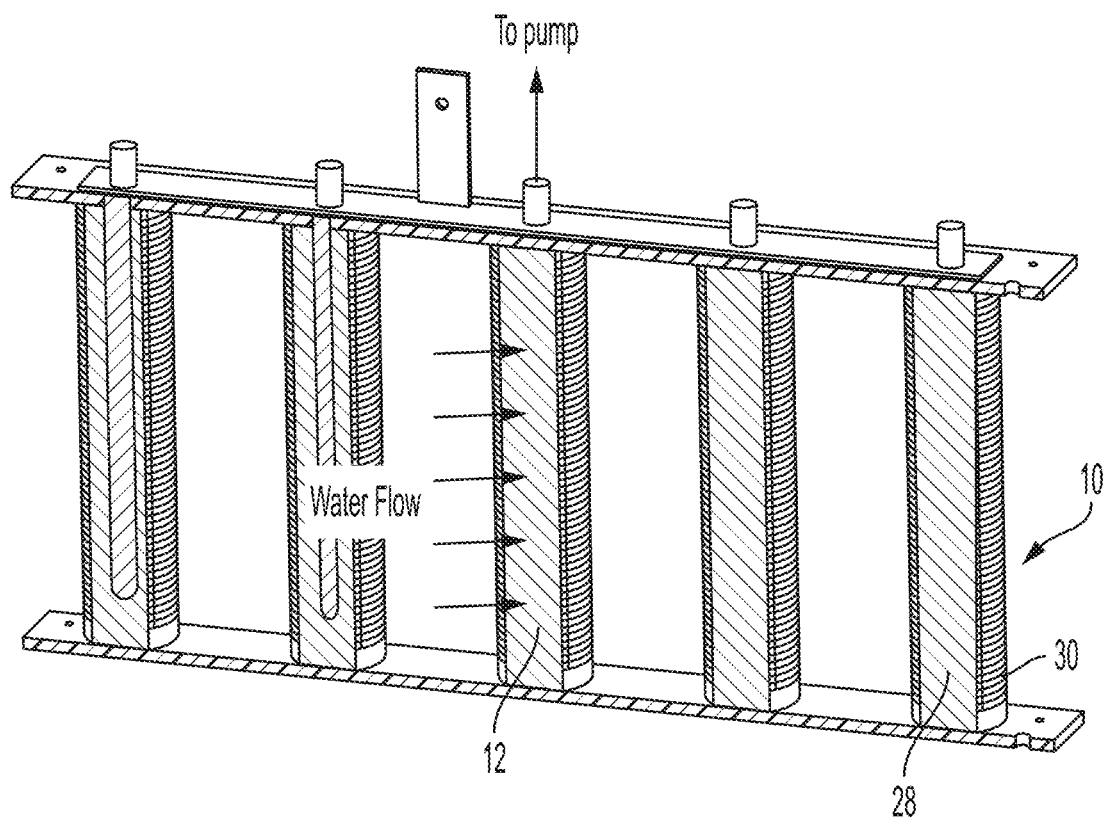
FIG. 1 is a cross-section view of filter anodes and perforated cathodes, in accordance with an embodiment.

Referring to FIG. 1, in one embodiment, is an electrochemical reactor system for use in the water treatment process, wherein an electrode array 10 will be immersed into the algae plume in a water supply (e.g. a lake); water will be pumped out of a filter 12, on which anodic potential will be applied. Algae (microcysts) cells will be ruptured and the microcystin will be oxidized by the electrochemically generated hydroxyl radical and chlorine.

The electrochemical reactor contains control boxes 14 and electrode arrays 10. With regard to FIGS. 2(a) and (b), control box 14 contains the following components: 1) programmable logic controllers 16 and touch panel to adjust the pump flow rate, and voltage/current; 2) DC power supply 18; 3) two pumps 20, 22, one drives water to flow through the porous electrode, the other one serves as a backwashing pump to clean the electrode; 4) Storage chamber 26 to store electrode, tubes, and cables.

In a preferred embodiment, the length of electrode array 12 is nine meters (see FIG. 3a). It can be folded for ease of transportation as shown in FIG. 3b by hingedly connection sections of arrays such that each array can fold relative to the adjacent array. The array 12 contains 30 anodes 28 (one anode is shown in FIG. 3c). Each anode 28 is placed within a perforated stainless-steel cathode 30 (as shown in FIG. 1).

Anode 28 is comprised of a titanium metal filter 30 with average pore size as 50 μm and a surface coating of Magnéli phase T4O7 electrocatalysts. The Ti4O7 is coated on to the titanium metal filter 30 by plasma spraying. In the plasma spraying process, Ti4O7 nanoparticles are melted at high temperature (2500-3000° C.) and then ejected by a high velocity Ar gas flow to the surface of Ti metal filter 30. After cooling, a dense Ti4O7 coating is formed on the exterior surface of Ti filter 30. As described above, the electrode array 12 will be immersed into the algae plume in the water supply/lake; water will be pumped out of the filter (FIG. 1), on which anodic potential will be applied by DC power supply 18. Algae (microcysts) cells will be ruptured and the microcystin will be oxidized by the electrochemically generated hydroxyl radical and chlorine.

Figures 4A, 4B, 4C:
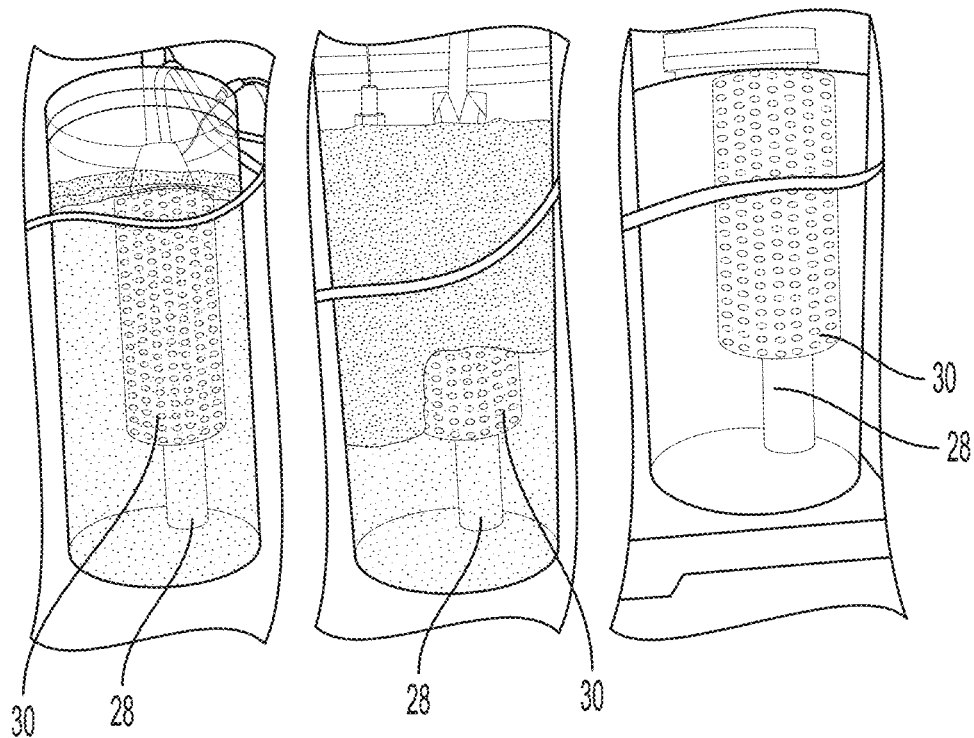
FIGS. 4(a), 4(b) and 4(c) are sequential side views of test results of an electrode module composed of a filter anode and a perforated cathode, with (a) electrode module was immersed in lake water contaminated with microcystis; (b) treatment in progress; (c) treated water after a few minutes, in accordance with an embodiment.

As shown in FIGS. 4(a)-4(c) an experimental set-up illustrates tests on a single module containing a filter anode 28 and a perforated cathode 30 that were performed in lake water contaminated with microcystis. FIG. 4(a) shows the electrode module immersed in lake water contaminated with microcystis; FIG. (b) shows the treatment in progress; and FIG. 4(c) shows the treated water after a few minutes. As shown in this sequence, the electrochemical treatment can rapidly inactivate microcystis evidenced by the rapid discoloration of water, reflecting the degradation of intracellular green pigment chlorophyll-a of microcystis.

Figure 5:
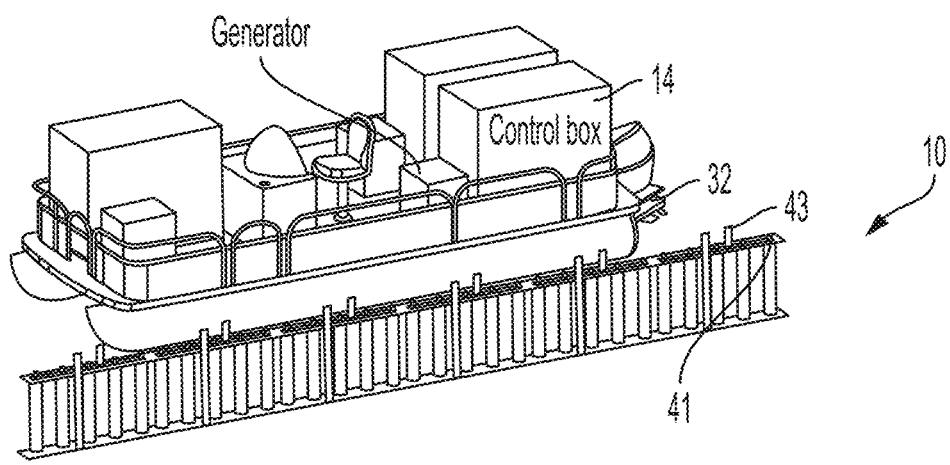
FIG. 5 is a perspective view of a configuration of boat mount equipment with electrode rack immersed in the water, in accordance with an embodiment.

As shown in FIG. 5, in one application the control boxes 14 is installed on a pontoon boat 32. Electrode array 10 are immersed into the lake. The control box 14 provides DC power (via power supply 18) to the underwater electrode array 10, pump water out of the filter anode via pumps 20, and recirculate the treated water back to the lake via pump 22. The whole electrochemical algae treatment system can be driven by a power supply 40, such as a generator, grid power, or solar power. The top outlets of the filter anodes will be connected with the water pump 20. Titanium strips are welded with stain-steel cathodes 41 (blue) and filter anodes 43 (red) and extended above the water. Electrical connections are made by connecting the titanium strips and DC power supplies with cables.

In operation, the electrode rack can be dragged by the boat to trace and treat the algal plume. The filter anodes can treat the water when the boat is moving.

Figure 6:
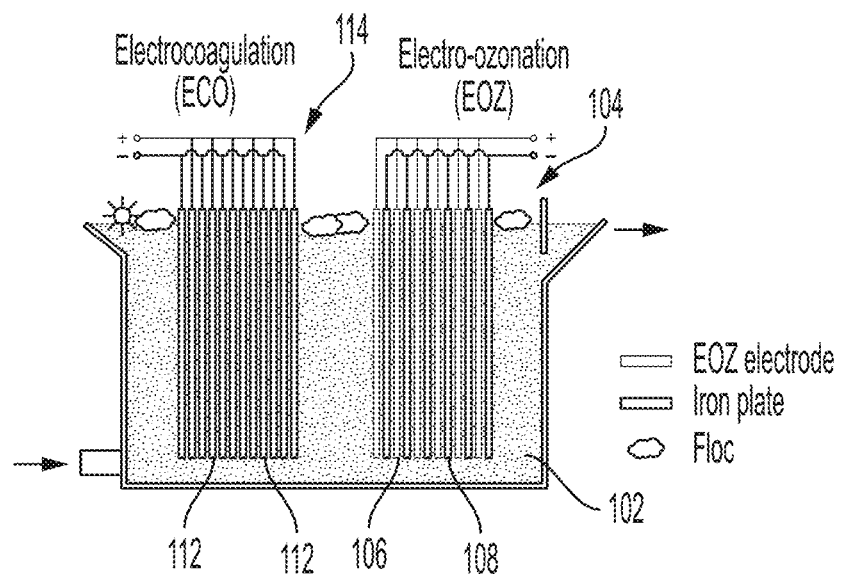
FIG. 6 is a side elevation view of ECO+EOZ electrochemical reactor for harmful algae bloom mitigation, in accordance with an embodiment.

In another aspect of the invention, referring to FIG. 6 a reactor 100 combining electrocoagulation (ECO) and electro-ozonation (EOZ) to remove harmful algae and destruct microcystins in lake water and seawater, and demonstrates an alternative form of boat-mount algal treatment unit reactor 100 which comprises an open tank 102 with an electrode array 104 immersed in the tank 102. Mesh-type anodes 106 that can produce ozone are coupled with mesh stainless steel cathodes 108 to form the array that is then immersed in tank reactor and placed on the boat. Iron plates 112 are used as both anodes and cathodes to form ECO electrode array 114. Water is fed into the tank through the bottom of the reactor. Treated water will be discharged from the overflow weir back to the lake. The electrode arrays are driven by direct current. The reactor is installed on a boat, barge, or dock. The reactor can be powered by grid electricity, batteries, or solar panels.

In operation, contaminated lake water or seawater is pumped into the tank (via pump as in control box 14). ECO electrode array 114 releases Fe2+, which is instantly transformed to flocs composed of Fe(OH)-2 and Fe(OH)3 to capture algae cells. Flocs will be brought to the surface by the gas bubbles evolved from the electrolysis reactions and separated from water. EOZ electrode array 104 produces various oxidants, including ozone ($O_3$), chlorine (HOCl/OCl—), and hydroxyl radical (·OH). These oxidants can decompose microcystins. The ECO and EOZ electrode arrays 114, 104 can be deployed alone or in combination. When operated in combination, the highest performance can be obtained due to the accelerated conversion of $O_3$ to ·OH by $Fe^{2+}$.

The reactor 100 can be installed on a boat, barge, or dock. In other form factors, a reactor could be housed in a container on shore and be used for residential or commercial applications treating 10-1,000 GPM; a stationary unit that is placed directly in water in an area known to have frequent occurrence of HABs, and wherein solar power could be a preferred power source; or units installed in line with existing water treatment systems (residential, commercial and municipal set-ups). Further, if combined with an autonomous boar having sensors that identify the presence of HABS, a reactor could be used in combination to destroy the HABs.

The ECO electrodes are made of iron in the forms of plate, mesh, or rod.

Figure 7:
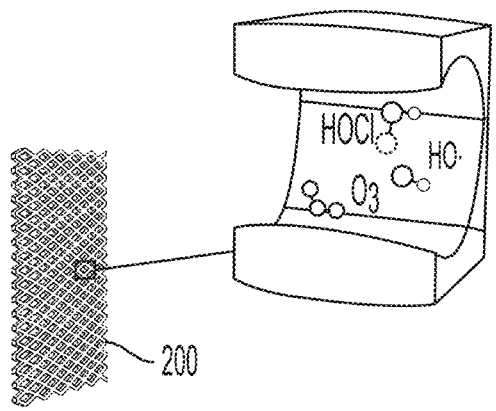
FIG. 7 is a schematic illustration of the configuration of EOZ anode with water being passed through the pore structures of EOZ anode and instantly reacting with electrochemically produced oxidants, in accordance with an embodiment.

The anode of the EOZ electrode array is made of titanium mesh coated with $SnO_2$ based electrocatalysts (see FIG. 7 which shows the configuration of EOZ anode 106. Water is passed through the pore structures of EOZ anode 106 and instantly react with electrochemically produced oxidants.). The following procedures prepare EOZ anode 106: 1) titanium mesh is coated with organic solutions, which contain tin (II)-organic complexes and other metal-organic complexes, by dip-coating or brush coating; 2) The coated titanium mesh is then calcinated at 500-600° C. to convert metal-organic complexes to metal oxides; 3) step 1 and 2 are repeated several times until the desired catalyst loadings are reached.

In an aspect of the invention, as has been described, a porous anode is provided for electrochemical oxidation mitigation of harmful algal bloom and cyanotoxins. In terms of the electrode material and the synthesis of electrocatalysts and the coating methods, the electrode is coated with electrocatalysts. Electrocatalysts could be single or mixed coatings of $Ti_4O_7$, antimony-doped tin oxide (ATO), nickel-doped Sb—$SnO_2$ (NATO), and fluorine-, nickel-codoped Sb—$SnO_2$ (F-NATO).

$Ti_4O_7$ particles are prepared by reducing $TiO_2$ at 800-1000° C. in pure $H_2$ atmosphere for 6-12 h.

ATO, NATO, and F-NATO electrocatalysts are prepared by thermal oxidation of the corresponding organic precursors coated on the Ti metal substrates to mixed metal oxides at 500-600° C. in air.

The ATO organic precursor is prepared by the following procedures:

Step 1: prepare citric acid sol-gel

Add citric acid (12.6 g) to 16 mL ethylene glycol at 90° C., stir till dissolved.

Step 2: prepare the ATO precursor

Add $SnCl_2$ (3.4 g) and $SbCl_3$ (0.5 g) to the citric acid sol-gel at 90° C., stir till dissolved.

The amount of chemicals and volume of sol-gel can be adjusted proportionally. For example, 126 g citric acid can be dissolved in 160 mL ethylene glycol to dissolve 34 g $SnCl_2$.

The Sb/Sn elementary molar ratio can range from 0.1 to 0.5.

To prepare NATO, $NiCl_3·6H_2O$ is added to citric acid sol-gel in step 2, along with $SnCl_2$ and $SbCl_3$. The Ni/Sn elementary molar ratio ranges from 0.01 to 0.1.

To prepare F-NATO, $NH_4F$ is added to the citric acid sol-gel in step 2 along with $NiCl_3·6H_2O$, $SnCl_2$, and $SbCl_3$. The F/Sn elementary molar ratio ranges from 1 to 5.

$Ti_4O_7$ can be blended in the precursors of ATO, NATO, and F-NATO to form slurry. The concentration of $Ti_4O_7$ in the slurry ranges from 10-50 wt %.

In terms of coating method, for the preparation of ATO, NATO, and F-NATO anodes, brush coating or dip coating methods can be used. For dip-coating methods, titanium substrate (mesh, plate, and filter cartridge) is immersed into precursors, pulled out at constant speeds, and then dried in air at room temperature. The coated Ti substrates are then placed in the oven at 500-600° C. for 10 min. The processes are repeated several times to reach desired loading amount (10-50 mg/cm2).

For the brush coating method, precursor solutions are coated on the substrate by a paintbrush. The calcination processes are the same as the dip-coating methods.

For the preparation of $Ti_4O_7$/ATO, $Ti_4O_7$/NATO, and $Ti_4O_7$/F-NATO anodes, $Ti_4O_7$ particles (10-50 wt %) are blended into the precursor solution to form slurry. The slurry is loaded onto Ti substrates (mesh, plate, and filter cartridge) via dip coating or brush coating. The coated substrates are then sintered at 800-1000° C. in $N_2$ atmosphere for 1 h. The coating-annealing cycles are repeated several times till the desired loading amount is reached.

Titanium filter cartridges contain only $Ti_4O_7$ are prepared by plasma spraying coating. In the plasma spraying process, $Ti_4O_7$ nanoparticles were melted at high temperature (2500-3000° C.) and then ejected by high-velocity (90 SCFH) Ar gas flow to the surface of a sintered Ti filter cartridge. After cooling, a dense $Ti_4O_7$ coating is formed on the exterior surface of the Ti filter cartridge.

The filter type anode 28 comprises a sintered titanium filter cartridge as the backbone and an electrocatalytic coating (e.g., ATO, F-ATO, F-NATO, $Ti_4O_7$/ATO, $Ti_4O_7$/F-ATO, $Ti_4O_7$/F-NATO, or $Ti_4O_7$ only). As previously described, FIG. 3c shows the picture of a $Ti_4O_7$ coated filter anode 28. The filter anode 28 is coupled with a cylindrical perforated stainless steel cathode 30 to form an electrode module. FIG. 3a shows an example of aligning thirty electrode modules in one rack 12. The rack 12 can be folded for transportation FIG. 3b.

For water treatment use, the electrode rack 12 will be immersed into water (lake water, seawater, wastewater, etc.). Anode potential will be applied between the filter anode 28 and the perforated cathode 30. Water will be pumped through the filter anode 28. During the filtration process, algae cells and microcystin will be destroyed by locally concentrated oxidants (HOCl, ClO—, $O_3$, ·OH) produced by EO reactions. The fouling of the filter anode 28 can be solved by reversing the water flow direction to backwash the filter.

Figure 8:
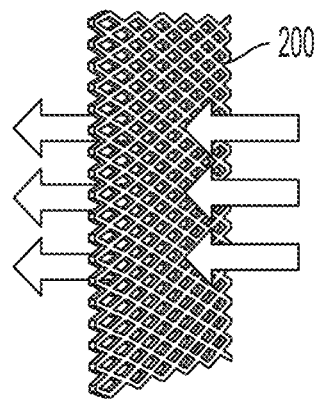
FIG. 8 is a schematic illustration of the configuration of the mesh-type anodes, in accordance with an embodiment.

Referring to FIG. 7 and FIG. 8, for the treatment of water containing high concentration suspended solids, a mesh type electrode may be used. Mesh type anode will be coupled with mesh-type cathode. Water will pass through the mesh structure 200. Algae cells and microcystin will be destroyed by locally concentrated oxidants produced by EO reactions. The mesh anode has pore-sizes of 1-10 mm.

EXAMPLES

Figure 9:
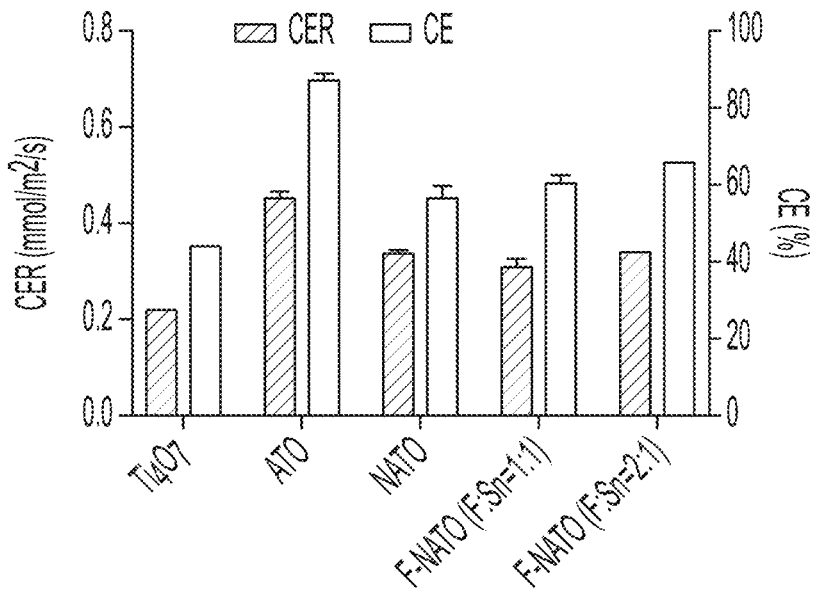
FIG. 9 is a graph showing chlorine evolution rate (CER) and current density (CE) of electrodes, in accordance with an embodiment.

Example 1. Impact of Electrocatalyst's Elementary Composition on Oxidant Production The production of chlorine by different electrodes was measured in 50 mM NaCl electrolyte. $Ti_4O_7$ filter cartridge and plate type electrodes with coatings of ATO, NATO, and F-NATO were operated at the same current density of 10 mA/cm2. Production of chlorine was measured by the HACH DPD method. The chlorine evolution rates normalized by the electrolyte volume and electrode surface area are compared in FIG. 9 (Chlorine evolution rate (CER) and current density (CE) of electrodes). The current efficiencies (i.e., faradaic efficiency; percentage of input current used to produce chlorine) were calculated accordingly. The results show that Ti4O7 coating can effectively produce chlorine by oxidizing chloride in water. All the SnO2 containing electrodes demonstrated higher reactivity toward chlorine evolution. Notably, NATO and F-NATO can produce ozone at current efficiency of 10-20% in 50 mM NaClO4 electrolyte.

Figure 10:
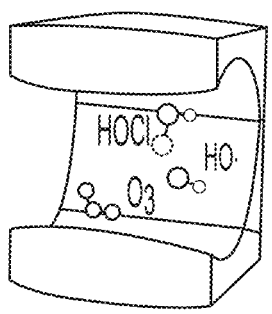
FIG. 10 is a schematic illustration of a mechanism of algae inactivation and cyanotoxin destruction in porous anode, in accordance with an embodiment.

Example 2. Enhanced Destruction of Algae Cells and Cyanobacteria by the Locally Concentrated Oxidant Produced by Electrochemical Oxidation Reactions When water passes through the pore structure of filter-type and plate-type anode, algae cells and cyanotoxins are exposed to high concentration oxidants, such as O3, ·OH, and HOCl/OCl— (FIG. 10—Mechanism of algae inactivation and cyanotoxin destruction in porous anode). In this design, algae and cyanotoxins can be rapidly destructed in a short retention time, with minimum residual oxidants in water.

Figure 11:
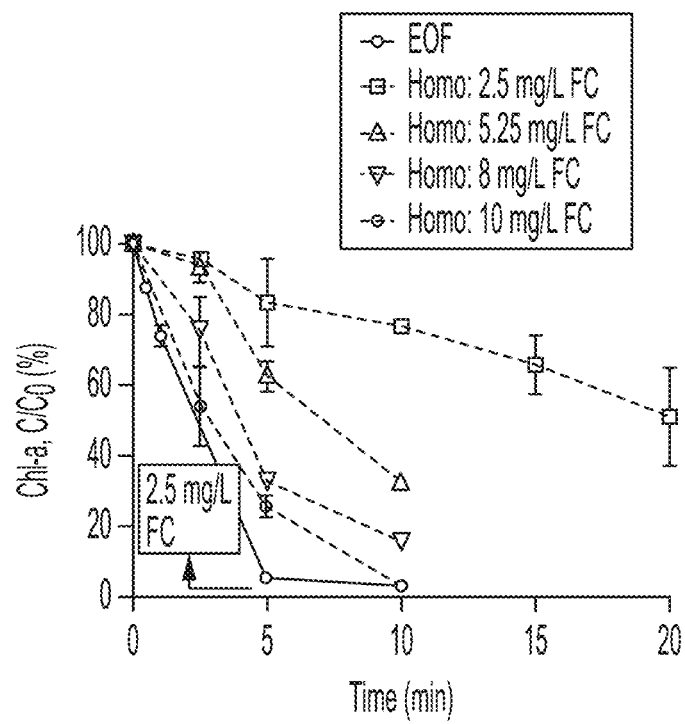
FIG. 11 is a graph showing comparison of the performance of electrochemical oxidation and filtration (EOF) process with homogenous chlorination process (Homo), in accordance with an embodiment.

FIG. 11 compares the performance of the electrochemical oxidation and filtration (EOF) process with that of the homogenous chlorination process. The EOF process uses the titanium filter cartridge coated with Ti4O7 as the anode. The anode filter was immersed in a 1.5 L batch reactor. Lake water spiked with cyanobacteria (CO=100 µg/L chlorophyll-a (Chl-a)) was passed through the filter at a flow rate of 1.5 L/min and then recirculated back to the reactor. EOF performed at 10 mA/cm2 could readily remove 90% of the cyanobacteria (indexed as the 90% reduction of Chl-a) at 5 min reaction time, leaving 2.5 mg/L free chlorine in the lake water. In order to achieve the same level of treatment, more than 10 mg/L free chlorine is required in the homogeneous chlorination process.

Specifically, for FIG. 11, the comparison is shown of the performance of electrochemical oxidation and filtration (EOF) process with homogenous chlorination process (Homo). The EOF process was performed using the titanium filter cartridge coated with Ti4O7-. For the Homo tests, different concentrations (2.5-10 mg/L) of free chlorine were added to the lake water. All the tests were performed in lake water spiked with cyanobacteria at a chlorophyll-a (Chl-a) concentration of 100 µg/L.

Figure 12:
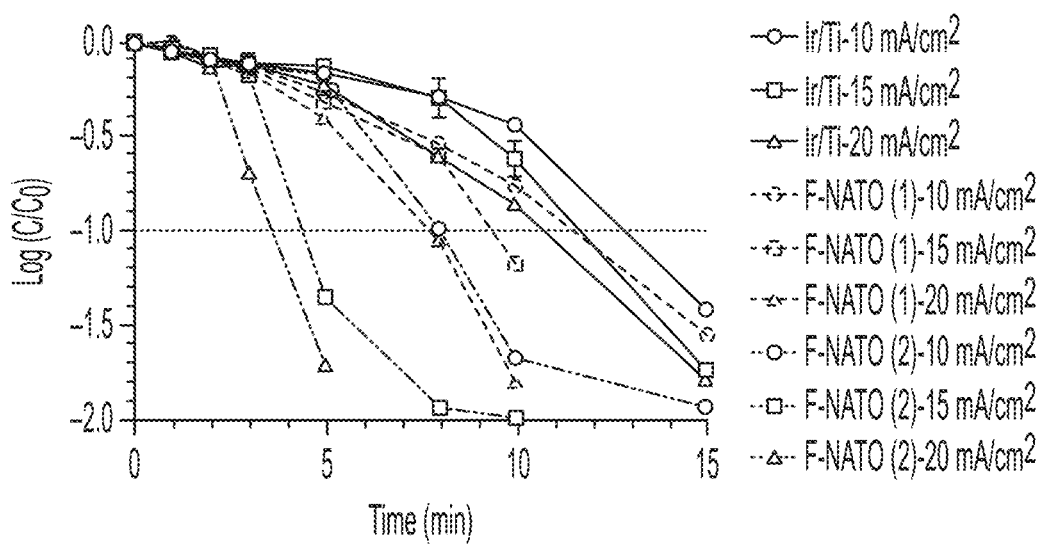
FIG. 12 is a graph showing removal of cyanobacteria by mesh-type electrode with F-NATO coatings. F-NATO (1) and (2) represent the F/Sn ratio of 1:1 and 2:2, respectively, in accordance with an embodiment.

Higher water treatment performance can be achieved on filter cartridges coated with ATO, NATO, and F-NATO. Mesh-type anodes with ATO, NATO, and F-NATO coatings can also effectively destruct algae and cyanotoxins. FIG. 12 shows an example of using the mesh-type electrodes to destruct cyanobacteria (CO=200 µg/L Chl-a) in lake water. The F-NATO anodes outperformed the commercial Ir/Ti electrodes (i.e., Ti mesh coated with IrO2).

Figure 13:
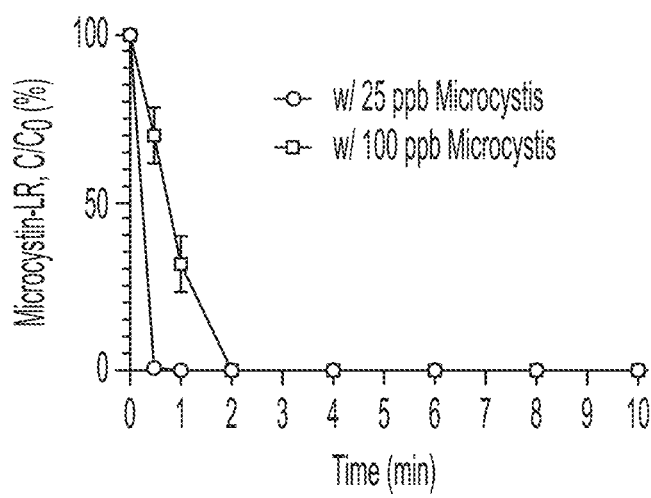
FIG. 13 is a graph showing treatment of microcystin-LR by Ti4O7 filter anode at a current density of 10 mA/cm$^2$, in accordance with an embodiment.

FIG. 13 shows an example of using Ti4O7 anode to treat microcystin-LR, a common cyanotoxins, in lake water. Complete destruction of microcystin-LR (C0=1 µg/L) was achieved within 2 min.

Example 3. Treatment of Lake Water by Boat Mount Equipment

Figure 14:
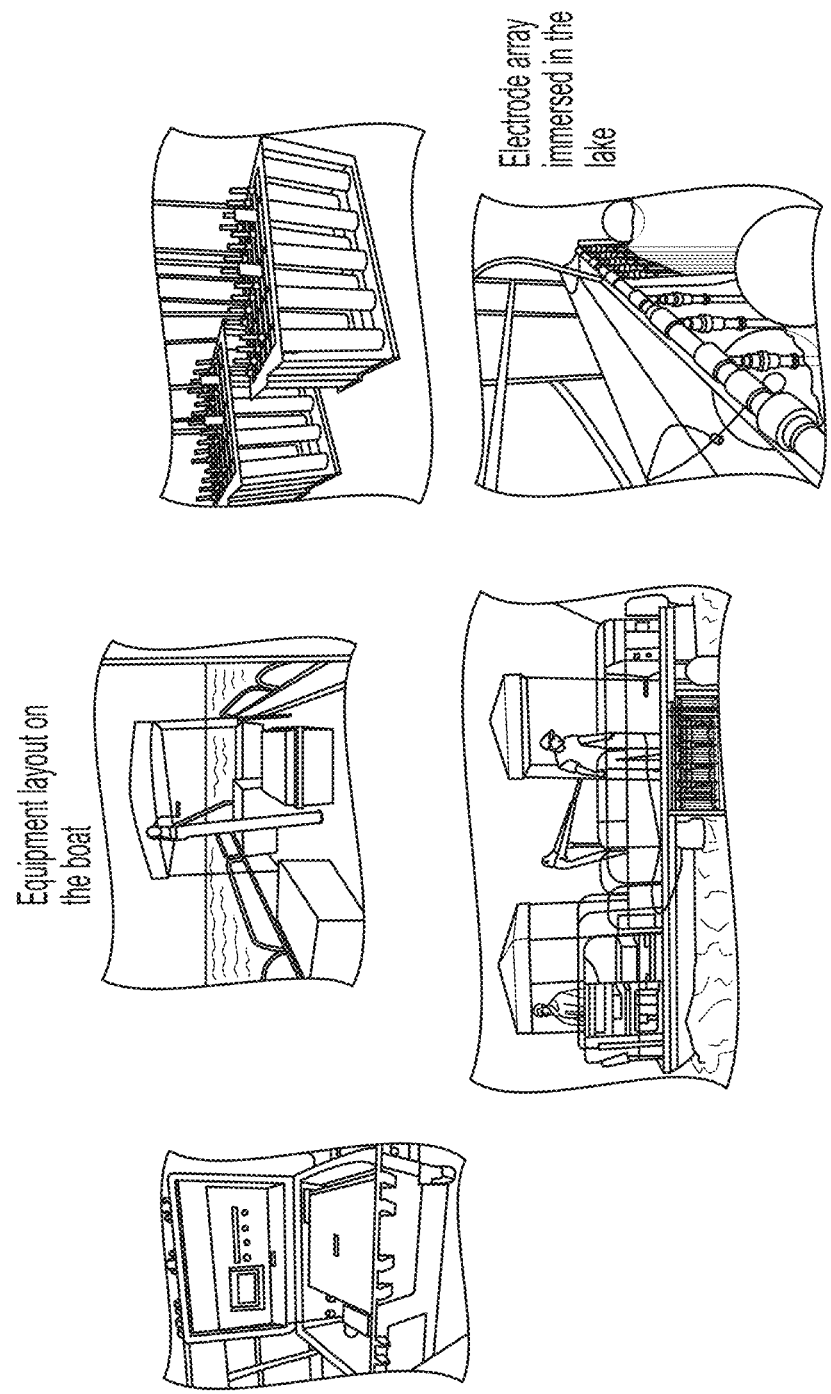
FIG. 14 is a series of images showing a Boat-mount device with filter anode as the key component to treat harmful algal bloom, in accordance with an embodiment.

FIG. 14 shows the photo of the boat mound device composed of filter anode (immersed in the lake water), power control box, pumps, and generator.

Figure 15:
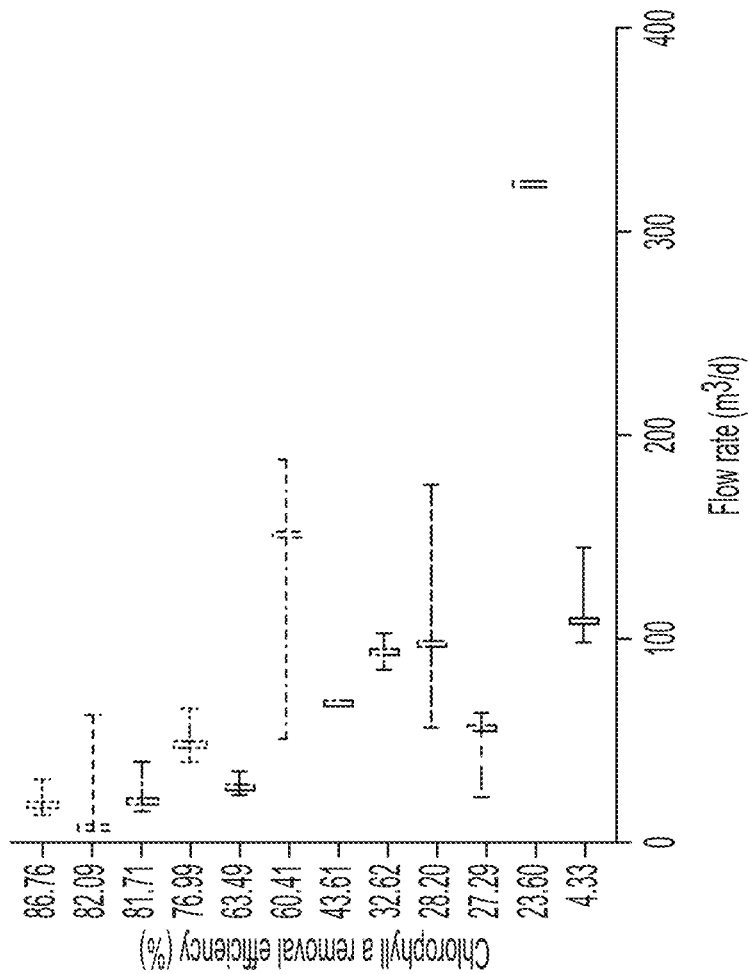
FIG. 15 is a graph showing removal of Chl-a by the EOF process at different flow rates, in accordance with an embodiment.

Device was tested for the treatment in lake water suffering from harmful algal blooming. Filter anodes were immersed in the lake water to enable the EOF process at treatment capacities of 10 to 300 m-3/d. The raw lake water contains 48 µg/L Chl-a. FIG. 15 shows that Chl-a was effectively removed after EOF treatment. The removal efficiency is reversely related to the flow rate of water passing through the filter anode. Similar trends were observed for the removal of microcystin and anatoxin (FIGS. 16a and 16b).

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A reactor combining electrocoagulation (ECO) and electro-ozonation (EOZ) to remove harmful algae and destruct microcystins in a water supply, comprising:
  a. a tank having a floor, sidewalls upstanding therefrom and having an upper edge, the floor and sidewalls collectively defining an open volume, an inlet port positioned adjacent the floor and an overflow weir defined by the upper edge of the sidewalls;
  b. an ECO electrode array comprising ozone producing anodes coupled to iron cathodes, and an EOZ electrode array comprising iron plates as both the anodes and cathodes, wherein the ECO and EOZ electrode arrays are each at least partially positioned within the open volume:
  c. a DC power source to drive the ECO and EOZ electrode arrays:
  d. a pump to pump the water supply into the tank's open volume through the inlet port, whereby the ECO electrode array releases $Fe^{2+}$, which is transformed to flocs composed of $Fe(OH)_2$ and $Fe(OH)_3$ to capture algae cells, the flocs being brought to the surface by gas bubbles evolved from the electrolysis reactions and separated from water, and the EOZ electrode array producing oxidants which decompose microcystins.

2. The reactor according to claim 1, wherein the oxidants include ozone ($O_3$), chlorine ($HOCl/OCl^-$), and hydroxyl radical ($\cdot OH$).

3. A method for producing an electro-ozonation (EOZ) anode electrode, comprising:
   a. coating titanium mesh with organic solutions which contain tin (II)-organic complexes and other metal-organic complexes:
   b. calcinating the coated titanium mesh at 500-600° C. to convert metal-organic complexes to metal oxides;
   c. repeating step 1 and 2 several times until the desired catalyst loadings are reached.

4. The method for producing an EOZ electrode anode according to claim 3, wherein the coating step is done by one of dip-coating or brush coating.

5. A method for producing an electrode comprising providing a porous anode for electrochemical oxidation mitigation of harmful algal bloom and cyanotoxins, and coating the porous anode with electrocatalysts particles comprising $Ti_4O_7$, antimony-doped tin oxide (ATO), nickel-doped Sb—$SnO_2$ (NATO), and fluorine-, nickel-codoped Sb—$SnO_2$ (F-NATO), wherein the ATO, NATO, and F-NATO electrocatalysts are prepared by thermal oxidation of corresponding organic precursors coated on Ti metal substrates to mixed metal oxides at 500-600° C. in air, wherein preparing the ATO organic precursor comprises:
   a. preparing citric acid sol-gel by adding citric acid (12.6 g) to 16 mL ethylene glycol at 90° C., stirring until dissolved; and
   b. preparing the ATO precursor by adding $SnCl2$ (3.4 g) and $SbCl3$ (0.5 g) to the citric acid sol-gel at 90° C., stirring until dissolved, and
   c. making adjustments of the Sb/Sn elementary molar ratio until it is in the range from 0.1 to 0.5.

6. The method of claim 5, wherein the $Ti_4O_7$ particles are prepared by reducing $TiO_2$ at 800-1000° C. in pure $H_2$ atmosphere for 6-12 h.

7. An electrode array, comprising:
   a. a plurality of segments each of which comprises:
      i. at least one anode each of which comprises a titanium metal filter and a surface coating of electrocatalysts;
      ii. at least one perforated stainless-steel cathode, wherein each of the at least one anode is positioned within a corresponding cathode;
   b. wherein each segment is hingedly connected to an adjacent segment, whereby the plurality of segments can be folded upon one another.

8. The electrode array of claim 7, wherein the average pore size of each titanium metal filter is 50 μm.

* * * * *